United States Patent
Eberspaecher (10) Patent No.: US 11,928,809 B2
(45) Date of Patent: Mar. 12, 2024

(54) DEVICE FOR GENERATING AN IMAGE OF AN OBJECT

(71) Applicant: Balluff GmbH, Neuhausen a.d.F. (DE)

(72) Inventor: Mark Eberspaecher, Frickenhausen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 379 days.

(21) Appl. No.: 17/526,213

(22) Filed: Nov. 15, 2021

(65) Prior Publication Data

US 2022/0156916 A1   May 19, 2022

(30) Foreign Application Priority Data

Nov. 17, 2020   (DE) .................... 10 2020 130 350.5

(51) Int. Cl.
| | | |
|---|---|---|
| *G06K 9/00* | (2022.01) | |
| *G05B 19/418* | (2006.01) | |
| *G06T 7/00* | (2017.01) | |

(52) U.S. Cl.
CPC ........ *G06T 7/0008* (2013.01); *G05B 19/4184* (2013.01); *G05B 19/41875* (2013.01)

(58) Field of Classification Search
CPC .............. G06T 7/0008; G05B 19/4184; G05B 19/41875; G01N 2021/8887; G01N 21/88; G01N 2021/845; G01N 21/3581; G01N 21/3586; G01N 22/00; G01S 13/881; G01S 13/90; G01S 17/90; G03B 42/06; G03B 42/08; G03B 42/00; G01V 3/12

See application file for complete search history.

(56) References Cited

U.S. PATENT DOCUMENTS

| | | | |
|---|---|---|---|
| 10,430,359 B2 | 10/2019 | Feinaeugle et al. | |
| 2006/0164287 A1* | 7/2006 | Holt ........................ | G01S 13/89 342/179 |

(Continued)

FOREIGN PATENT DOCUMENTS

| | | |
|---|---|---|
| DE | 10 2012 014 681 A1 | 12/2013 |
| DE | 20 2014 105 928 U1 | 1/2015 |

(Continued)

OTHER PUBLICATIONS

German Search Report dated Jun. 7, 2021 in German Application No. 10 2020 130 350.5 with English translation of the relevant parts.

*Primary Examiner* — Xin Jia (74) *Attorney, Agent, or Firm* — Collard & Roe, P.C.

(57) ABSTRACT

A device for generating an image of an object by electromagnetic waves has a transmission device which is set up to radiate electromagnetic waves in the direction of the object, a receiving device which is set up to receive electromagnetic waves from the object, and a digital processing and control unit which is set up to generate image data of the object from the measured data. Here, the transmission device and the receiving device are arranged in at least one modular unit. The digital processing and control unit has an interface via which different modular units can be exchangeably coupled to the digital processing and control unit. Here, the interface is set up to transmit data to the modular unit and to receive from this, to transmit control signals to the transmission device and to the receiving device, and to supply the modular unit with energy.

25 Claims, 7 Drawing Sheets

(56) References Cited

U.S. PATENT DOCUMENTS

2007/0235658 A1* 10/2007 Zimdars ............. G01N 21/3586
                                                                                    250/390.07
2019/0278000 A1* 9/2019 Schneebeck ....... G01N 21/3581

FOREIGN PATENT DOCUMENTS

| EP | 3 537 133 A1 | 9/2019 | |
|----|--------------|--------|---|
| WO | WO-2017030284 A1 * | 2/2017 | ........... G01S 13/885 |
| WO | WO-2019046689 A1 * | 3/2019 | ............... A61B 5/00 |

* cited by examiner

DEVICE FOR GENERATING AN IMAGE OF AN OBJECT

CROSS REFERENCE TO RELATED APPLICATIONS

Applicant claims priority under 35 U.S.C. § 119 of German Application No. 10 2020 130 350.5 filed Nov. 17, 2020, the disclosure of which is incorporated by reference.

BACKGROUND OF THE INVENTION

1. Field of the Invention

The present invention relates to a device for generating an image of an object by means of electromagnetic waves, said device being based on a modular approach with various modules. The device can be used to monitor and/or check objects, in particular as part of a quality control. As a result of the modular approach, the device can be used in various fields, such as material testing for example, in the food industry or in packaging.

2. Description of the Related Art

Today, many different imaging methods are known that are substantially based on two different approaches: acoustic waves and electromagnetic waves.

Acoustic waves are liable to disruptive influences such as external noise, air movements and the air temperature. In addition, acoustic waves, in particular ultrasonic waves in air, typically experience a high degree of attenuation.

In material testing and medical technology, examination with electromagnetic waves in the X-ray range is widely used. Electromagnetic waves in the X-ray range have the disadvantage that the energy content of the radiation emitted is very high, such that this has an ionizing effect. Thus, protective measures are necessary for examination with electromagnetic waves in the X-ray range, and there are specific regulations for the operation of such systems.

Examinations with electromagnetic waves in the microwave range, i.e. with wavelengths of a few millimeters up to a few centimeters, are mainly used in remote sensing, predominantly in conjunction with a Synthetic Aperture Radar (SAR). Recently, they have used been used in so-called body scanners.

Integrated transceiver switches are now available up to the terahertz range. Since the resolution capacity is determined by the wavelength, it is possible to differentiate between objects up to the range of millimeters. Thus, even subtle differences in the material state can lead to different diffusion properties and can thus be made visible.

Previous systems, above all when they are based on terahertz radiation or microwave radiation, are only designed as a compact complete system. The object to be examined must then be inserted into the complete system and removed after the analysis.

SUMMARY OF THE INVENTION

The object of the present invention is to propose a device for generating an image of an object by means of electromagnetic waves, which can be implemented in a simple manner into industrial systems, such as e.g., a band conveyor, and can then be adjusted to the situation present in situ.

A device for generating an image of an object by means of electromagnetic waves is proposed. Even if any kind of electromagnetic waves can generally be used, electromagnetic waves with a frequency below visible light are preferred. Electromagnetic waves in the terahertz range or in the microwave range with a frequency of between 1 GHz and 10 THz are particularly preferred. The suitable electromagnetic waves are chosen depending on the object to be penetrated, that is in such a way that the object is at least partially transparent for the electromagnetic waves.

The device has a transmission device and a receiving device as well as a digital processing and control unit. The transmission device is set up to radiate electromagnetic waves in the direction of the object. The receiving device is set up to receive electromagnetic waves from the object. During measuring, preferably both the amplitude and the phase of the received electromagnetic waves are measured. The device can be set up to carry out a reflection measuring, in which the transmission device and the receiving device are arranged on the same side of the object. With this kind of measuring, the electromagnetic waves radiated by the transmission device are reflected on the object, and the reflected electromagnetic waves are received by the receiving device. The device can also be set up to carry out a transmission measuring, in which the transmission device and the receiving device are arranged on opposite sides of the object. With this kind of measuring, the electromagnetic waves radiated by the transmission device transmit through the object, and the transmitted electromagnetic waves are received by the receiving device. The two kinds of measuring are described in detail below.

The digital processing and control unit is set up to generate image data of the object from the measured data. Here, it converts the measured signals into digital signals and then applies an algorithm for imaging onto the measured signal. In addition, the digital process and control unit is set up to control the modular unit. In the simplest case, with the measured data, only the electromagnetic waves measured by the receiving device and the electromagnetic waves radiated by the transmission device are used. In further variants, other data can also be used or incorporated, as is described in more detail below.

According to the invention, it is provided to arrange the transmission device and the receiving device in at least one modular unit. The modular unit is, accordingly, an independent module, also referred to as a high frequency front end module, which forms a closed functional unit and can be implemented constructively separately from the digital process and control unit. In the case of a reflection measuring, the transmission device and the receiving device are advantageously formed in a common modular unit. With a transmission measuring, the transmission device and the receiving device can also be arranged spatially separated from each other in different modular units.

The modular unit is connected to the processing and control unit in a signal-technical manner. To do so, the processing and control unit has an interface via which the modular unit can be coupled to the digital processing and control unit. Here, the modular unit is not permanently coupled to the processing and control unit, but can be replaced with other modular units. Different modular units with differently formed transmission devices and/or receiving devices can be coupled to the processing and control unit via the interface. The modular unit is formed exchangeably and can be coupled via the interface. The interface is set up to transmit data to the modular unit and to receive it from this, to transmit control signals to the transmission device and to the receiving device and to provide the modular unit with energy.

The different modular units are formed for different usage purposes and can be used depending on the situation and the requirements and coupled to the processing and control unit. Thus, many fields of application emerge, of which only a few will be mentioned below by way of example:

Recognizing anomalies of the object;
Recognizing foreign bodies (predominantly in the food industry);
Complete control during the packaging process;
Checking the homogeneity of the object;
Recognizing production errors in plastic parts and in metal parts, such as e.g. air pockets, cavities, back or over spraying;
Material testing free from destruction;
Density or mass recognition;
Filling level measuring;
Ascertaining height profiles; and
(Layer) thickness measuring.

As a result, the device can be prepared in a simple manner for different situations at the site of use. In addition, the modular construction means that the transmission device and the receiving device can be positioned substantially freely and thus can be used in present systems. For example, the modular units can be positioned directly above a conveying band with the aid of a holding device.

A device for moving the object can be provided, such as e.g., a conveying band, by means of which the object can be arranged to fit the modular units.

Optionally, the modular unit has a pre-processing device. The pre-processing device is set up to generate partial image data of the object from the electromagnetic waves received. Here, the pre-processing device can convert analog signals into digital signals and forward these on. The interface between the modular unit and the digital processing and control unit is then set up to transmit the partial image data. Furthermore, the digital processing and control unit is set up to generate the image data from the partial image data. The generation of the partial image data constitutes a pre-processing step which is carried out in the modular unit. Thus, the digital processing and control unit is relieved. In particular for the case described below in which several modular units are simultaneously connected to the digital processing and control unit, the calculation for the digital processing and control unit is simplified. The partial image data can constitute a precursor to the image data or can be image data of a partial image that is received by the respective sensor.

It can be provided that the digital processing and control unit and at least one modular unit are arranged in a common housing. Furthermore, each modular unit here furthermore forms a closed functional unit. The at least one modular unit is selected depending on application, inserted into the housing, and coupled to the digital processing and control unit via the interface. The common housing offers the advantage of it forming a closed body and having a high stability.

It can also be provided that the digital processing and control unit and at least one modular unit are arranged in different housings. The housing of the at least one modular unit can be connected to the housing of the digital processing and control unit, and the at least one modular unit can be coupled to the digital processing and control unit via the interface. This offers the advantage of the at least one modular unit being able to be selected depending on application and then being able to be joined together with the digital processing and control unit in situ. Furthermore, the modular unit can be exchanged in a simple manner and additionally in situ.

Preferably, the modular unit has a fixing element, with which it can be fixed on the digital processing and control unit and/or on another modular unit. The digital processing and control unit or the modular unit can have a complementary fixing element that interacts with the fixing element. Advantageously, the fixing element is arranged on a housing of the modular unit. Thus, the modules can be connected among one another, whereby fewer fastenings on the periphery are necessary.

The modular unit preferably has an antenna device for radiating and/or receiving electromagnetic waves. The antenna device has at least one antenna, via which the electromagnetic waves can be radiated and/or received. In a reflection measuring, in particular the same antenna device can be used for radiating and receiving. A separate transmission antenna and a separate receiving antenna can also be provided. The at least one antenna can preferably be designed in such a way that its radiation behavior can be changed and adjusted to the respective situation. The antenna device can be formed to irradiate the electromagnetic waves directly onto the object. With moving objects, for example on a conveying band, the antenna device is advantageously formed to irradiate the electromagnetic waves in the half space in front of the modular unit. Thus, when moving from different angles and/or in different positions, the object is examined, in particular at a greater distance apart and next to the modular unit. The antenna unit can also have a device for moving the at least one antenna.

The modular unit preferably has a transceiver which is set up to provide an electrical signal for generating the electromagnetic waves and to compile an electrical signal from the electromagnetic waves received. The transceiver can be part of the transmission device and/or part of the receiving device. Alternatively, instead of a transceiver, a transmitter can also be provided in the transmission device, said transmitter providing an electrical signal for generating the electromagnetic waves, as well as a receiver in the receiving device, said receiver compiling an electrical signal from the electromagnetic waves received. Preferably, the transceiver supplies the above-mentioned antenna unit with the electrical signal and amplifies the electromagnetic waves received by the antenna unit, such that these are converted into an electrical signal that can be recorded in a metrological manner. Preferably, the amplitude and the phase of the received electromagnetic waves are measured.

Preferably, the transmission device irradiates waves with only one frequency. Alternatively, the transmission device can also radiate the electromagnetic waves with several frequencies of a frequency range. The transmission device is set up to receive the electromagnetic waves with exactly this frequency or with exactly these frequencies in the frequency range. If the object consists of a greatly lossy material, a modular unit having a transmission device with lower frequency and correspondingly longer wavelength can be chosen, such that a high penetration depth is achieved. In contrast, if a material with only low losses is present, a high frequency can be chosen, by means of which a high spatial resolution is achieved transversely to the diffusion direction. From this, the advantage emerges that a modular unit with the desired frequency/frequencies can be selected and used depending on the usage conditions and object to be examined. In order to set the frequency in situ, the above-mentioned electrical signal of the transceiver, in particular, can be controllable and can be emitted corresponding to the desired frequency.

The terahertz range and/or the microwave range with a frequency of between 1 GHz and 10 THz can be seen as the advantageous frequency range. Accordingly, the transmission device is set up to emit electromagnetic waves in the frequency range of from 1 GHz to 10 THz, and the receiving device is set up to receive the electromagnetic waves in this frequency range. Yet other frequency ranges can also be chosen, which comply with regulatory specifications, in particular, or can be selected according to economic viewpoints.

Preferably, the transmission device and the receiving device have several measuring channels. In a first variant, each channel is formed by a separate antenna. A single-channel transceiver is preferably then allocated to each antenna. Thus, a plurality of antennae and transceivers which corresponds to the number of measuring channels is provided. A further variant provides to use a multi-channel transceiver, which is connected to several antennae. Here, the transceiver can have either one transmission channel or also several transmission channels and several receiving channels. Thus, on one hand, a sufficient density of measuring points is to be ensured, on the other hand as few measuring points as possible are to be used. In particular, sparsely distributed antenna groups can be provided or a multiple-input-multiple-output (MIMO) approach can be used.

The transmission device and the receiving device can be set up to carry out a reflection measuring on the object. The transmission device and the receiving device are preferably arranged in the same modular unit and, particularly preferably, use the same antenna unit and the same transceiver to radiate and receive the electromagnetic waves. Very advantageously, the transmission device and the receiving device are arranged in such a way that the electromagnetic waves are radiated from the transmission device directly onto the object, and the electromagnetic waves reflected by the object are received directly by the receiving unit.

Optionally, an absorber can be arranged opposite the transmission device on the other side of the object. The electromagnetic waves that penetrate the object are absorbed by the object, and thus only the waves reflected or scattered by the object are received by the receiving device. Alternatively, a reflector can be arranged opposite the transmission device on the other side of the object facing away from the transmission device. The electromagnetic waves that penetrate the object are reflected by the reflector and pass through the object once again before they are received by the receiving device. Thus, diffusion properties can be ascertained better in the object. The absorber and the reflector thus constitute different electromagnetic limiting conditions for the reflection measuring. It can also be provided that it can be switched between the different limiting conditions. Moreover, it can be provided that a moving object passes regions with different limiting conditions during its movement when the absorber and the reflector are arranged one next to the other in the movement direction of the object.

The transmission device and the receiving device can be set up to carry out a transmission measuring on the object. The transmission device and the receiving device are preferably arranged in different modular units that are arranged on different sides of the object. Very advantageously, the transmission device is arranged in such a way that the electromagnetic waves are radiated directly onto the object, and the receiving device is arranged opposite in such a way that the electromagnetic waves are received directly through the object.

The digital processing and control unit can be set up to ascertain a movement of the object from the measured data. In the general case, a relative movement between the object and the modular unit, specifically the antenna unit, is ascertained. Since the modular unit with the antenna unit is typically stationary when measuring and the movement direction of the object is known, the movement speed of the object can be ascertained directly from the measured data. To do so, the double shift or a tracking method of a control center of the object can preferably be used. This is particularly suitable in the event that the object moves on a conveying band, and the modular units are fixedly arranged in relation to the conveying band. The movement of the object can be included when generating the image data. In particular with a reflection measuring from the measured data of a scattering and/or a reflection, the object speed, i.e., the speed of the entirety of all scattering elements/reflection elements can be ascertained.

The modular unit can be arranged spatially separated from the digital processing and control unit. In this case, the interface between the modular unit and the digital processing and control unit can be set up to transmit the data between the two components. The interface can then be formed as a radio connection. To do so, established radio connections can be used.

Preferably, a calculator network (cloud) can be provided, and the interface can be formed as a connection to the calculator network. Optionally, the digital processing and control unit can be implemented at least partially in the calculator network, or the calculator network can be formed to carry out a pre-processing of the measured data. Grid-bound interfaces or radio-based interfaces for the calculator network can be provided. The interface can also be formed as a bus system in order to simultaneously couple several modular units. In addition, a storage medium can be provided, on which the measured data are intermedially stored, and which is then transported to the digital processing and control unit. The digital processing and control unit can be set up to ascertain the image data in a temporally independent manner.

It can be provided to simultaneously couple several modular units to the digital processing and control unit via the interface mentioned above. The several modular units can here be constructed in the same manner and have the same functions. Alternatively, different modular units can also be provided which are constructed differently and/or have different functions. In this case, the digital processing and control unit can correspondingly control the different modular units. By using several modular units, the region to be recorded can be adjusted. Purely in principle, many modular units can be randomly connected to the digital processing and control unit. Preferably, at most 10 modular units per digital processing and control unit are used in order to limit the calculating effort for the digital processing and control unit.

In a preferred arrangement, the several modular units are arranged in lines. Here, the several modular units are arranged one next to the other along a line, that is an imaginary line. Thus, the object can be simultaneously measured along this line, and the line constitutes a spatial dimension of the measuring.

Preferably, the digital processing and control unit can control the several modular units in such a way that these respectively simultaneously carry out a measuring in sequences running temporally one after the other. At one point in time, the modular units each simultaneously carry out one measuring. After a predetermined temporal distance, the modular units then simultaneously carry out a further measuring. Thus, a further dimension of the measuring is achieved. This is advantageous, in particular, in the context of the linear arrangement mentioned above and an object moving perpendicularly to the line. If the object moves perpendicularly to the line of the modular units, it passes through the linear arrangement. By controlling the linearly arranged modular units, these each simultaneously carry out a measuring along the line in sequences temporally one after the other. Between the sequences, the object moves with a movement speed, such that, in the next simultaneous measuring, a different cut-out of the object is measured. Thus, a two-dimensional measuring is achieved.

Optionally, a reference signal can be provided, by means of which the several modular units are coherently controlled in order to carry out the measuring. The reference signal can be provided by the digital processing and control unit and can be transmitted by the interface.

The several modular units can be arranged in different orientations to the object. For this, the modular units can be arranged one next to the other or in lines. Alternatively, the several modular units are arranged freely, such that the object can be received by several sides. The transmission device is arranged to radiate the electromagnetic waves from different directions onto the object. In addition, the receiving device is set up to receive the electromagnetic waves from different directions from the object. As a result, the object is received from several perspectives. The several perspectives lead to an improved imaging. Moreover, the necessary frequencies can be reduced. The several directions additionally offer the advantage that the object can lie behind an obstacle that is impenetrable for the electromagnetic waves in one direction; however, it can be freely accessible from a different direction. Thus, the waves transmitted from a transmission unit can be scattered on the object or propagated by the object and received by another receiving unit of a further modular unit.

As described above, the modular units can have different functions. The respective transmission devices of the several modular units can radiate electromagnetic waves with different polarization, and the corresponding receiving devices of the modular units can receive the electromagnetic waves with the corresponding polarization. Thus, scatterings of the object dependent on the polarization can be recognized, which leads to an improved imaging. In addition or alternatively, the respective transmission devices of the several modular units can radiate electromagnetic waves with a different frequency, and the corresponding receiving devices of the modular units can receive the electromagnetic waves with the corresponding frequency. Thus, with an object whose material is greatly lossy in one frequency range and is not or only minimally lossy in another frequency range, suitably choosing the different frequencies makes it possible to X-ray the object and simultaneously to easily make out the surface of the material.

Furthermore, the device according to the invention can have an image evaluation unit, which is set up to evaluate the image data generated by the digital processing and control unit. For this, inherently known methods can be used for the image evaluation (image postprocessing). As an example, in particular the object is identified in the image data and compared to reference objects saved in advance. Anomalies of the object, such as e.g., foreign bodies or production errors or an erroneous filling quantity or number of components or similar, can be recognized by the image evaluation unit. Output signals are then generated, and the generated output signals are output. The output signals function, in particular, as control signals for other devices, which, if one of the above-mentioned anomalies emerges, lead to the object departing from the normal process and being examined, processed or disposed of, or being treated specifically in a different manner.

On one hand, the image evaluation unit can be part of the digital processing and control unit and, in particular, can run on a common calculating device. On the other hand, the image evaluation unit can be formed as an individual module. Here, the image evaluation unit can be arranged in the same housing as the digital processing and control unit. Similarly, the image evaluation unit can have a separate housing and can be arranged in particular spatially separately from the digital processing and control unit. In these cases, the image evaluation unit can be connected to the digital processing and control unit by means of a further interface. The further interface is set up to transmit the image data from the digital processing and control unit to the image evaluation unit. Here, the further interface can be formed as a radio connection. Preferably, the interface can be formed as a connection to a calculation network, in particular to the calculation network mentioned above.

Furthermore, the image evaluation unit can be connected to several digital processing and control units. The image evaluation unit is set up to evaluate the image data generated by the digital processing and control unit in each case and to generate output signals from this and to output the output signals generated. As a result, a central image evaluation unit is obtained for several digital processing and control units, such that the number of image evaluation units required can be reduced. In addition, the image evaluation unit can combine the image data of the several digital processing and control units, in order to evaluate these together.

It can also be provided that the digital processing and control unit is formed to recognize anomalies of the object, such as e.g. foreign bodies or production errors or an erroneous filling quantity or the number of components or similar, when generating the image data. As a result, the anomalies can already be established before the image has been completely generated. Alternatively or additionally to the image evaluation, this can be carried out by the image evaluation unit described above.

The digital processing and control unit can have an output interface, via which the image data and/or the output signals generated can be output. If an image evaluation unit described above is present, this can preferably have the output interface. Advantageously, the output interface is formed as an IO-link interface, Ethernet or as a fieldbus interface. Control signals and/or parameters can also be input into the device via the output interface.

A self-check can be provided for the device according to the invention. For this, the digital processing and control unit and/or the image evaluation unit mentioned above can be formed to identify a constant label from the image data. This constant label is advantageously a fixed point in the surroundings, such as e.g., the ground or a certain part of a machine, on which the device is arranged, or similar. When this label can no longer be identified in the image data, an error signal is output.

Further sensors can be provided that can be coupled to the digital processing and control unit and/or the image evaluation unit and can deliver additional measuring data. Alternatively, the digital processing and control unit and/or the image evaluation unit can obtain the measuring data from further sensors without being directly coupled to these. The digital processing and control unit and/or the image evaluation unit includes the measuring data of the further sensors in the evaluation. An example for the further sensors is an optical sensor, such as an optical camera, which provides optical image data of the object for the image evaluation unit. The image evaluation unit can include the optical image data in the evaluation of the image data generated by the digital processing and control unit. The position, the contour and the surface of the object can already be ascertained beforehand by the optical image data. Yet cameras in other spectral ranges can also be used, such as e.g. infrared. Furthermore, the further sensors can be range finders, by means of which the position and/or the movement or the movement speed of the object are ascertained. Depending on the position of the object and/or on the movement or the movement speed of the object, the measuring can be then triggered automatically. Moreover, the further sensors can also be based on different operating principles.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Different exemplary embodiments of the device according to the invention are depicted in FIGS. 1A, 1B, 1C, 1D, and 1E. The same components are labelled with the same reference numerals and, for reasons of clarity, these are only described once. The features of the individual exemplary embodiments can, when not otherwise described, also be assumed for the other exemplary embodiments. FIGS. 1A, 1B, 1C, and 1D each show exemplary embodiments with two modular units 10, 11, a digital processing and control unit 20 and an image evaluation unit 30. In further exemplary embodiments, further modular units or also only one modular unit can also be provided.

The modular units 10, 11 are each formed in the form of an individual module, which is referred to as a high frequency front end module, as a closed functional unit. The modular units 10, 11 each have a transmission device and/or a receiving device, which is not depicted here and reference is made to FIGS. 2A, 2B, 3A, 3B, and 4 for the description of this. The transmission device radiates electromagnetic waves in the direction of the object, and the receiving device receives the electromagnetic waves from the object. In addition, each modular unit 10, 11 has a pre-processing device (not depicted) which generates partial image data of the object from the electromagnetic waves received by the receiving device and forwards this to the digital processing and control unit 20. In this embodiment, the several modular units 10, 11 are constructed in the same way and have the same functions. In further embodiments, the modular units 10, 11 differ and output electromagnetic waves with a different frequency and/or polarization, for example.

The modular units 10, 11 are connected to the digital processing and control unit 20 via an interface. The first interface S1 is formed as a wire-bound internal communication connection between the two components. In order to connect several modular units 10, 11 to the digital processing and control unit 20, the first interface S1 is formed as a bus system. With the wire-bound connection, a separate cable can be provided for each modular unit 10, 11 or the connection to the individual modular units 10, 11 is at least partially produced via the same cable. The wire-bound connection can also be looped through by the respective modular units 10, 11. Measuring data are transmitted from the modular units 10, 11 to the digital processing and control unit 20 via the first interface S1, and control signals are transmitted from the digital processing and control unit 20 to the transmission device and/or receiving device of the modular units 10, 11. In addition, the modular units 10, 11 are provided with energy from an energy supply E, as described below, via the first interface S1.

Figure 2A:
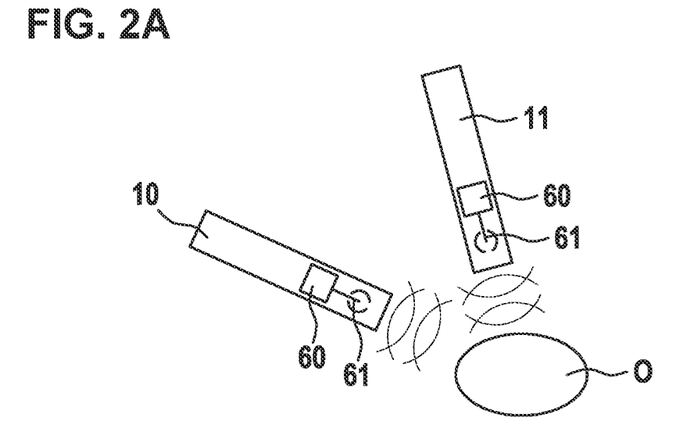
FIGS. 2A, 2B, 3A, and 3B each show a schematic depiction of various arrangements of the modular units in reflection measuring.
Figure 2B:
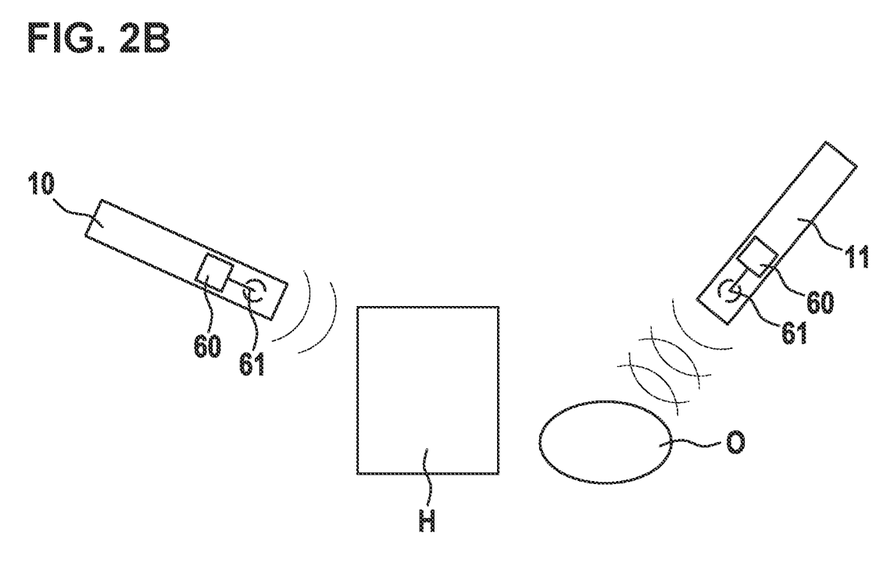
Figure 6:
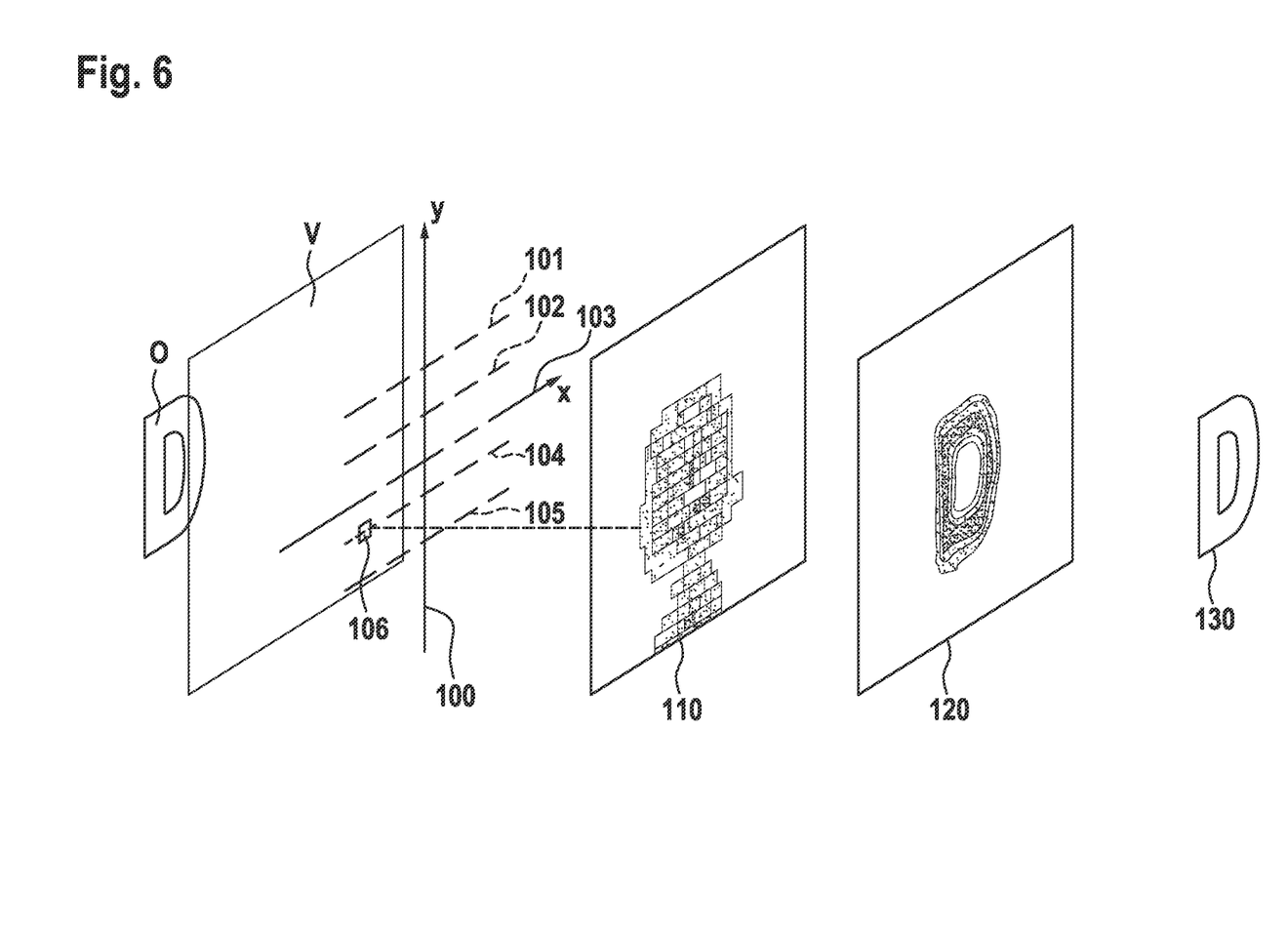
FIG. 6 schematically shows the sequence of a measuring method.

In relation to the functionality of the digital processing and control unit 20 and the image evaluation unit 30, reference is made to the description of FIGS. 2A, 2B, and 6. A second interface S2 is provided between the digital processing and control unit 20 and the image evaluation unit 30, said interface being formed as an Ethernet connection or as a USB connection, for example. The image evaluation unit 30 is supplied with energy via an energy supply E and forwards this on to the digital processing and control unit 20 via the second interface S2.

In addition, the image evaluation unit 30 has a third interface S3, which functions as an output interface. The third interface S3 is formed as an IO-link interface or, in other embodiments, as a fieldbus interface or as an Ethernet interface. Output signals, which are generated by the image evaluation unit 30 and, optionally, by the digital processing and control unit 20, are output via the third interface S3. Control signals and/or parameters for the digital processing and control unit 20 and/or for the image evaluation unit 30 can also be input via the output interface.

Figure 1A:
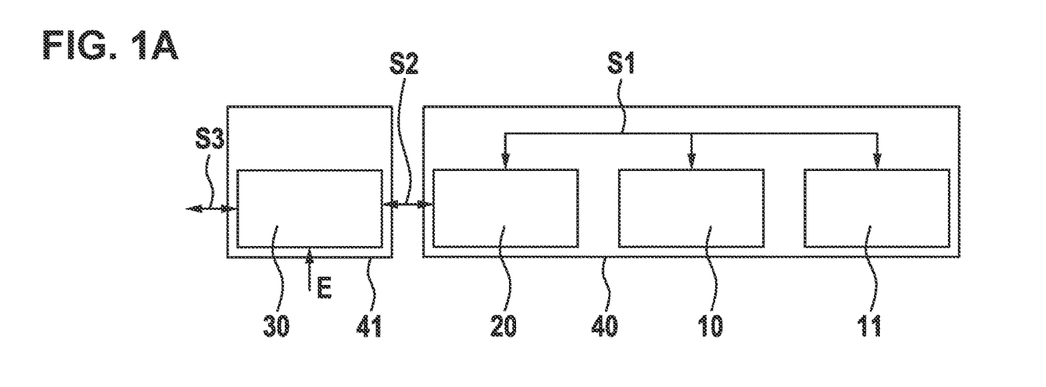
FIGS. 1A, 1B, 1C, 1D, and 1E each show a schematic depiction of different exemplary embodiments of the device according to the invention.

FIG. 1A shows a first exemplary embodiment, in which the digital processing and control unit 20 and the two modular units 10, 11 are arranged in a common housing 40. The modular units 10, 11 nevertheless each form independent closed functional units. Each modular unit 10, 11 is connected to the digital processing and control unit 20 via the first interface S1, which constitutes an internal communication connection. In this exemplary embodiment, the image evaluation unit 30 is arranged in a separate housing 41, whereby it can be placed spatially separated from the processing and control unit 20 and the modular units 10, 11. The image evaluation unit 30 is connected to the digital processing and control unit 20 via the second interface S2 formed as a wire-bound Ethernet connection or USB connection.

Figure 1B:
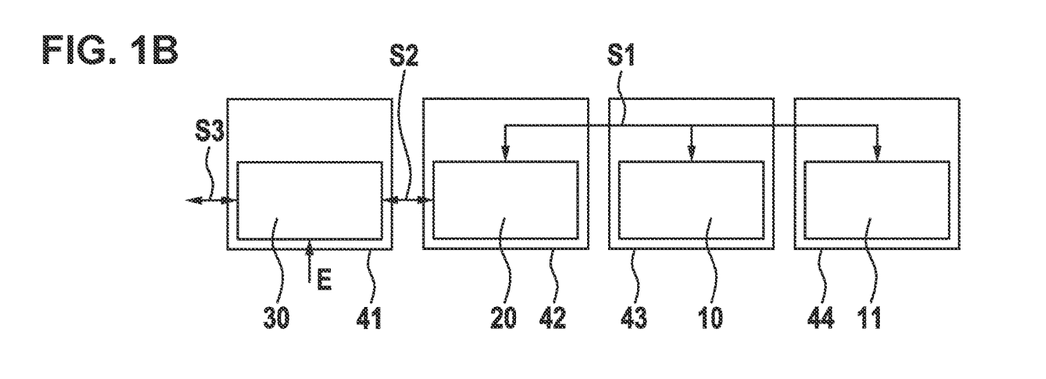

FIG. 1B shows a second exemplary embodiment, in which the digital processing and control unit 20 is arranged in a housing 42 and each modular unit 10, 11 is arranged in a separate housing 43, 44 each. The housing 43 of a modular unit 10 is then connected to the housing 42 of the digital processing and control unit 20, and the housing 44 of the other modular unit 11 is connected to the housing 43 of the modular unit 10 arranged before it. For this, the housings 43, 44 of the modular units 10, 11 each have a fixing element (not shown), with which they can be fixed on the housing 42 of the digital processing and control unit 20 or on the housing 43 of the modular unit 10 arranged before this. The housing 42 of the digital processing and control unit 20 and the housings 43, 44 of the modular units 10, 11 each have a complementary fixing element (not shown), which interacts with the fixing element, in order to produce a fastening. The fastening is a plug connection, for example. The first interface S1 is here also implemented via the plug connection. In this way, many modular units can be randomly coupled to the digital processing and control unit 20. As described in the first exemplary embodiment, the image evaluation unit 30 is arranged in a separate housing 41, and in relation to this, reference is made to the description above.

Figure 1C:
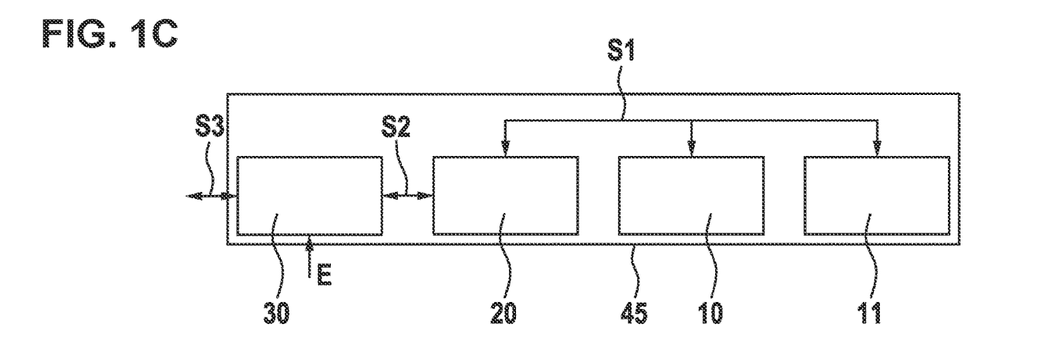

FIG. 1C shows a third exemplary embodiment, which differs from the first exemplary embodiment in that the image evaluation unit 30 is arranged in a common housing 45 together with the digital processing and control unit 20 (and, in this example, with the modular units 10, 11). In this example, the image evaluation unit 30 is furthermore formed as a closed functional unit and is connected to the digital processing and control unit 20 via the second interface S2. In a further example, the image evaluation unit 30 can also be part of the digital processing and control unit 20. As a result of the arrangement of the modules 10, 11, 20, 30 in one housing 45, this can be used as one component at the site of application. The image evaluation unit 30 can also be arranged in a common housing in the device according to the first, the second and the fourth exemplary embodiment together with the digital processing and control unit 20.

Figure 1D:
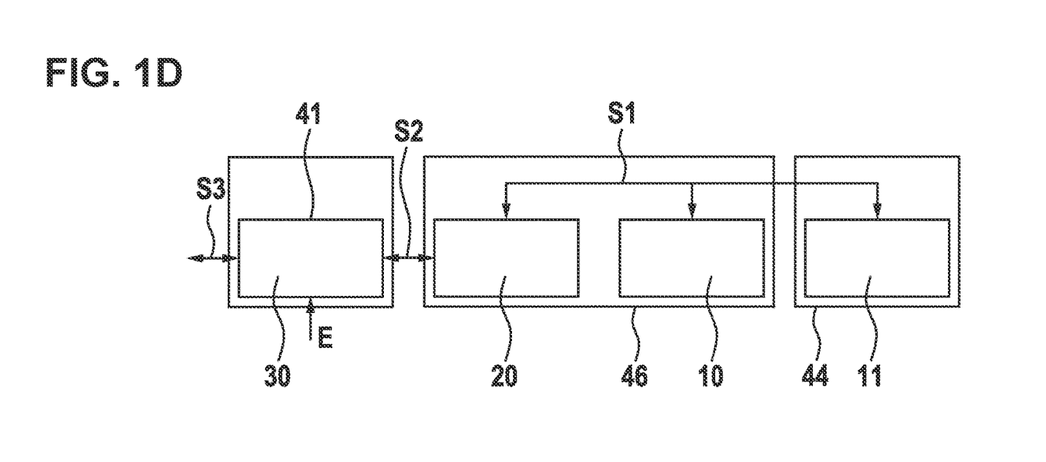

FIG. 1D shows a fourth exemplary embodiment in which a first modular unit, as described in connection with the first exemplary embodiment, is arranged in a common housing 46 with the digital processing and control unit 20. As described in connection with the second exemplary embodiment, a second modular unit 11 is arranged in a separate housing 44 and is connected to the housing 46 via the plug connection.

Figure 1E:
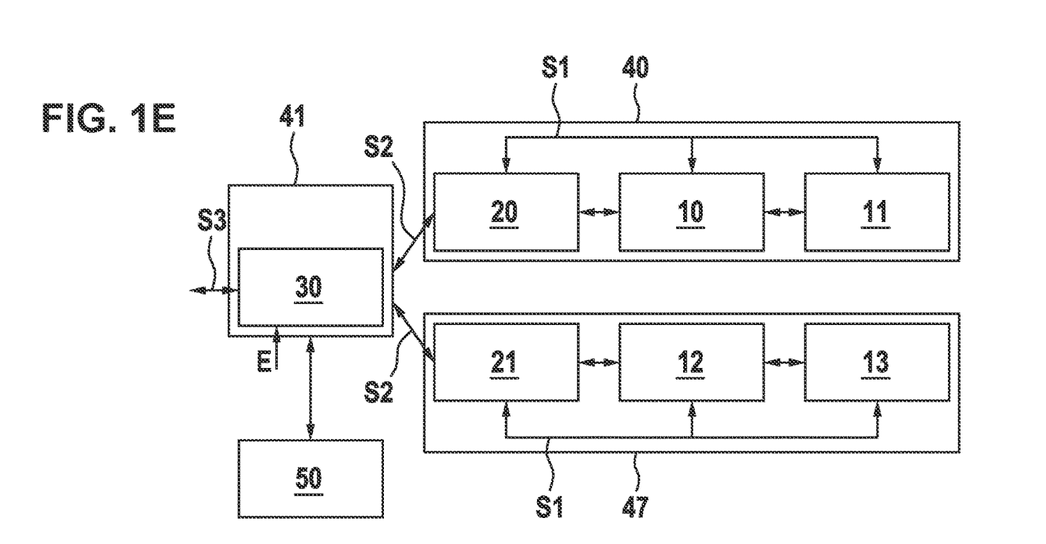

FIG. 1E shows a fifth exemplary embodiment in which the modular image evaluation unit 30 is connected to two digital processing and control units 20, 21. As described in connection with the first exemplary embodiment, a first digital processing and control unit 20 is arranged in a common housing 40 with two modular units 10, 11 and is coupled to these. Analogously, a second digital processing and control unit 21 is arranged in a common housing 47 with two further modular units 12, 13. The image evaluation unit 30 receives image data from the two digital processing and control units 20, 21 and evaluates the image data in combination and, on this basis, generates the output signals.

In addition, an optical camera 50 is provided which provides optical image data of the object O to the image evaluation unit 30. The image evaluation unit uses the optical image data when evaluating the image data generated by the digital processing and control unit 20. Using the optical image data of the optical camera 50, the position, the contour and the surface of the object can already be ascertained in advance. The optical camera 40 can also be provided in other exemplary embodiments in the same way.

In further embodiments, the interfaces S1, S2 can be formed as a connection to a computer network, which functions as a cloud. In this case, the digital processing and control unit 20 or parts thereof can be implemented in the computer network. The interfaces S1, S2 and S3 can also be formed as a radio connection.

In FIGS. 2A and 2B, an arrangement of two modular units 10, 11 for a reflection measuring of an object O is respectively shown. The construction of such a modular unit 10, 11 is then described by means of the first modular unit 10: the first modular unit 10 is formed as a high frequency front end module and has a transceiver 60 and an antenna unit 61, which comprises at least one antenna not shown. The transceiver 60 is connected to the antenna unit 61 and provides this with an electrical signal, with which the antenna device 61 generates electromagnetic waves. In order to set or change the frequency in situ, the electrical signal of the transceiver 60 can be controlled and can be output corresponding to the desired frequency. The transceiver 60 and the antenna unit 61 thus function as the transmission device. The frequency of the electromagnetic waves lies in a frequency range of from 1 GHz to 10 THz, i.e., in the microwave range or in the Terahertz range. The electromagnetic waves are radiated by the at least one antenna in the direction of the object O. There, the electromagnetic waves are reflected or scattered and diffuse back to the modular unit 10. The scattered or reflected electromagnetic waves are received by the at least one antenna of the antenna unit 61 and converted by the transceiver 60 into an electrical signal that can be recorded in a metrological manner. For this, the transceiver 60 can downmix the received signal to a low baseband frequency, wherein a baseband with a high frequency of 0 Hz is also possible. The antenna unit 61 and the transceiver 60 thus also function as the receiving unit. The electrical signal is then transmitted to the digital processing and control unit 20 via the first interface S1 not depicted and processed there. The baseband signals are pre-processed and digitalized by the digital processing and control unit 20. In addition, a predetermined algorithm is applied to the baseband signals, by means of which an imaging method is implemented. For this, various algorithms for image calculation are known. For example, the back projection algorithm can be used. The digital processing and control unit 20 is additionally set up to control the transceiver 60.

In this embodiment, the second modular unit 11 is constructed in the same way and has the same components and functions. The control of the second modular unit 11 is carried out by the digital processing and control unit 20 in the manner described above. In another embodiment not depicted, the two modular units 10, 11 are constructed differently and/or have different functions. For example, the two modular units 10, 11 can output electromagnetic waves with a different frequency and/or polarization. In this case, the digital processing and control unit correspondingly controls the different modular units 10, 11.

In FIG. 2A, the two modular units 10, 11 are directed towards the object O and each irradiate electromagnetic waves onto it. The modular units 10, 11 are arranged at different positions and have different orientations. Thus, the object O is received by the modular units 10, 11 from different perspectives. Based on the received signals of the two modular units 10, 11, the digital processing and control unit 20 implements the imaging method. The several perspectives here lead to an improved imaging.

In FIG. 2B, the two modular units 10, 11 are also directed towards the object and are arranged on different sides of the object O. In the case depicted, an obstacle H is located between the first modular unit 10 and the object. The obstacle H is impenetrable for the electromagnetic waves emitted by the antenna unit 61 of the first modular unit 10. The second modular unit 11, however, has clear sight of the object O. Thus, the measuring is only carried out by the second modular unit 11.

Figure 3A:
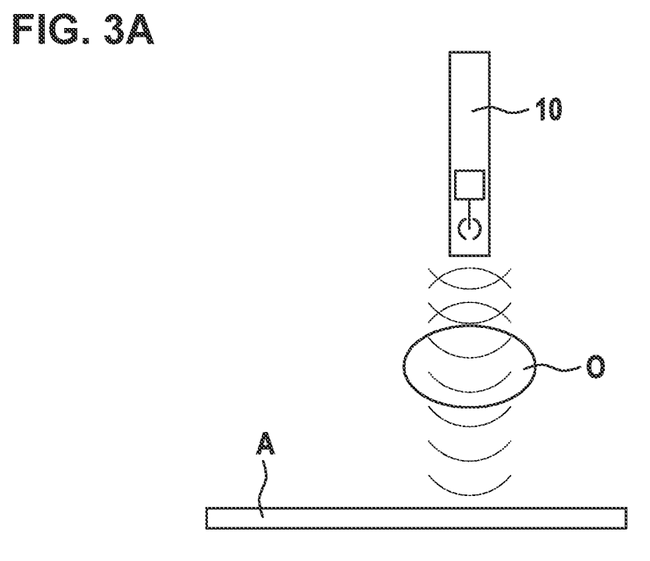
Figure 3B:
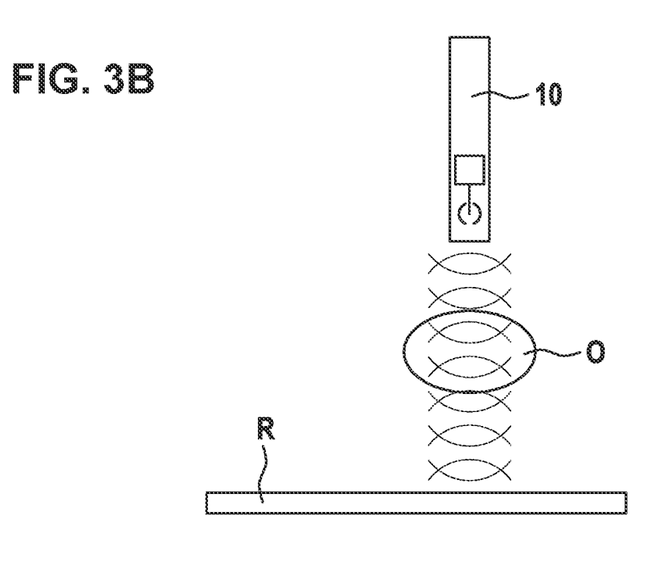

In FIGS. 3A and 3B, an arrangement of a modular unit 10 and an additional limiting condition for a reflection measuring of an object O are respectively shown. The modular unit 10 corresponds to that described above. In FIG. 3A, an absorber A is arranged opposite the modular unit 10 on the other side of the object O. The electromagnetic waves that penetrate the object O are absorbed by the absorber A, and thus only the waves reflected or scattered by the object O are received by the antenna device 61. In FIG. 3B, a reflector R is arranged opposite the modular unit 10 on the other side of the object O facing away from the modular unit 10. The electromagnetic waves that penetrate the object O are reflected by the reflector R and pass through the object O again before they are received by the antenna device 61. Thus, diffusion properties in the object can be better ascertained. The absorber A and the reflector R can also be arranged one next to the other. The limiting conditions described can be assumed for the exemplary embodiments described.

Figure 4:
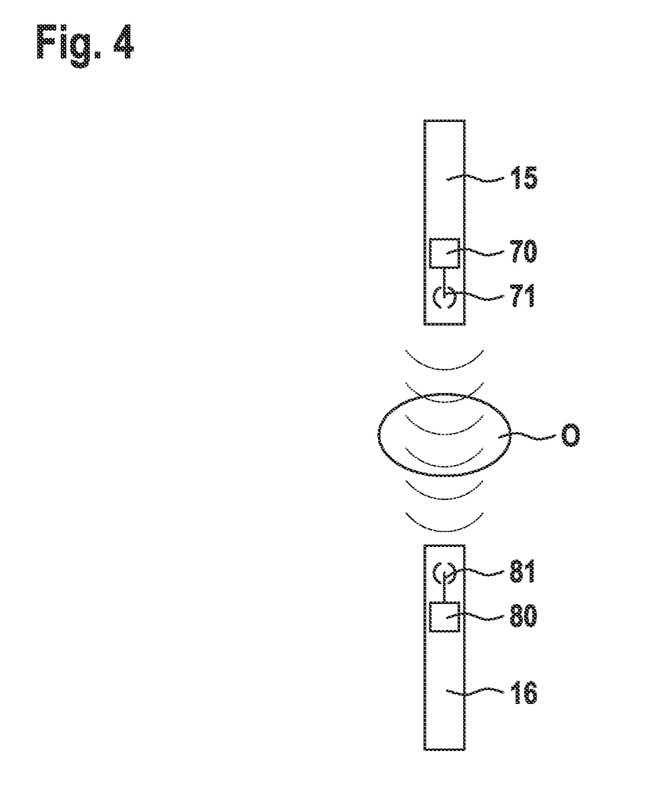
FIG. 4 shows a schematic depiction of an arrangement of the modular units in transmission measuring.

In FIG. 4, an arrangement of two modular units 15, 16 for a transmission measuring of an object O is shown. The first modular unit 15 is formed as a high frequency front end module and has a transceiver 70 and an antenna unit 71, which comprises at least one antenna not shown. Instead of the transceiver 70, a transmitter can also be provided in the first modular unit 15 in the transmission measuring. The transceiver 70 is connected to the antenna unit 71 and provides this with an electrical signal, with which the antenna device 71 generates electromagnetic waves. In order to set or change the frequency in situ, the electrical signal of the transceiver 70 can be controlled and can be output corresponding to the desired frequency. The transceiver 70 and the antenna unit 71 thus function as a transmission device. The frequency of the electromagnetic waves lies in a frequency range of from 1 GHz to 10 THz, i.e., in the microwave range or in the Terahertz range. The electromagnetic waves are radiated by the at least one antenna in the direction of the object O. There, the electromagnetic waves penetrate the object O and reach the other side.

A second modular unit 16 is arranged opposite the first modular unit 15, said second modular unit also being formed as a high frequency front end module. The second modular unit 16 has a transceiver 80 and an antenna unit 81, which comprises at least one antenna not shown. Instead of the transceiver 80, a receiver can also be provided in the second modular unit 16 in the transmission measuring. The transmitted electromagnetic waves are received by the at least one antenna of the antenna unit 81 and converted by the transceiver 80 into an electrical signal that can be recorded in a metrological manner. For this, the transceiver 80 can downmix the received signal to a low baseband frequency, wherein a baseband with a frequency of 0 Hz is also possible. The antenna unit 81 and the transceiver 80 thus also function as the receiving unit. The electrical signal is then transmitted to the digital processing and control unit 20 via the first interface S1 not depicted in this Figure. The baseband signals are pre-processed and digitalized by the digital processing and control unit 20. In addition, a predetermined algorithm is applied to the baseband signals, via which an imaging method is implemented. For this, various algorithms are known for image calculation. For example, the amounts of the individual measuring points can be interpreted as pixels, which thus result in an image. The digital processing and control unit 20 is additionally set up to control the transceivers 70 and 80.

Figure 5:
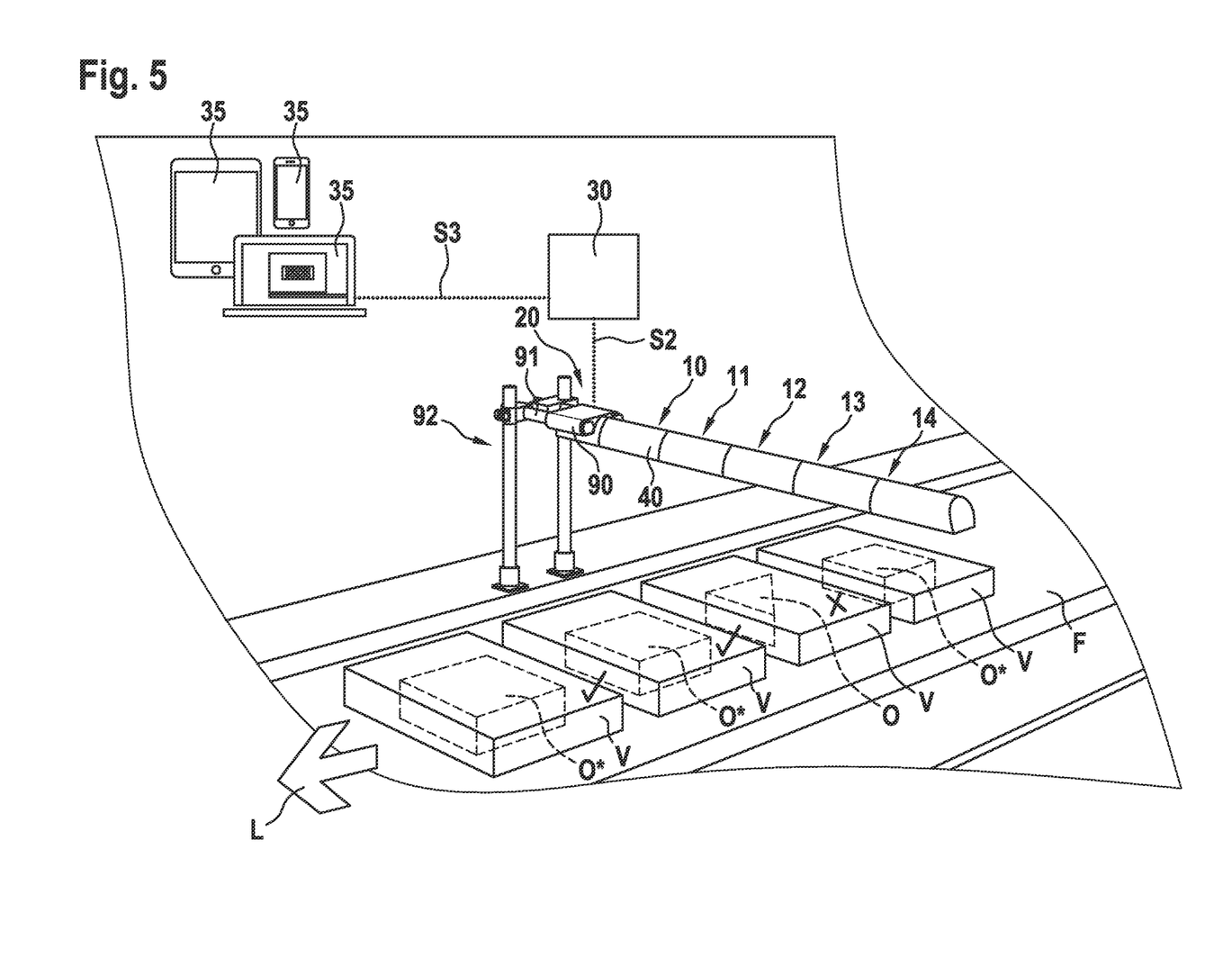
FIG. 5 shows an isometric view of the device according to the invention and an object to be examined on a band conveyor.

In FIG. 5, an exemplary application for the device according to the invention on a band conveyor F is shown. Several objects O, O*, which are each surrounded by packaging V, are moved on the band conveyor F in the running direction L of the band conveyor F. The device according to the invention serves to check the objects O, O* through the packaging V. In this example, an incorrect object O is to be identified. An incorrect object has anomalies, for example. In the situation depicted in FIG. 5, the two objects O* on the left-hand side have already been checked by the device according to the invention, the central object O is being checked by the device according to the invention and the object O* on the right-hand side is then checked. Here, five modular units 10-14 are provided which are positioned above the band conveyor F. The five modular units 10-14 are arranged according to the first embodiment of FIG. 1A in a common housing 40 with the digital processing and control unit 20 and are constructed in the same way in this embodiment and have the same functions. The five modular units 10-14 are arranged in lines along a line perpendicular to the running direction L of the band conveyor F and are oriented in opposition to the running direction L and substantially cover the entire width of the band conveyor F.

The common housing 40 has two tubular fixing elements 90 on the end, on which the digital processing and control unit 20 is arranged, on opposite sides. In each case, one holding rod 91 of a holding device 92 is inserted into these tubular fixing elements 90 in order to position the device according to the invention above the band conveyor F.

The five modular units 10-14 are controlled together by the digital processing and control unit 20, that is to say in such a way that the units 10-14 carry out a measuring in sequences running temporally one after the other with a predetermined temporal spacing in each case simultaneously along the line. For this, the digital processing and control unit 20 transfers an optional reference signal to the coherent controller of the modular units 10-14 via the first interface S1. When the object O moves in the running direction L of the band conveyor F, each of the five modular units 10-14 measures a measuring point of the object O with each sequence of the measuring carried out at different positions in the running direction L. The spatial distance of the measuring points results directly from the movement speed of the object O and the temporal spacing of the measuring events carried out one after the other. Since the modular units 10-14 are fixed via the holding device 92 and are thus not moved and the movement direction of the object O is predetermined by the running direction L of the band conveyor F, the movement speed of the object O can be directly ascertained from the measured data. For this, the double shifting or a tracking method of a scattering center of the object O, for example, is used. As described below in connection with FIG. 6, the measuring events are then evaluated. The modular units 10-14 have a pre-processing device not shown, with which partial images can be compiled out of the measured data. The partial images are then transmitted to the digital processing and control unit 20 and there linked to a whole image.

The whole image is transmitted to the image evaluation unit 30 via the second interface S2. Finally, the image evaluation unit 30 evaluates the whole image and assesses the object O, O*. If the object is identified as not to be objected to, as is the case for the two objects O* on the left-hand side, these can be processed further as usual. In contrast, if the object is identified as to be objected to, as is the case with the central object O being examined, an error signal is emitted. The object O can then be treated specifically depending on the situation. The output signals generated by the image evaluation unit are emitted to an output device 35, such as e.g., a PC (e.g., a laptop) or a mobile terminal (e.g., a smartphone or a tablet), via the output interface S3 formed as an IO link, Ethernet or fieldbus.

FIG. 6 schematically shows the sequence of a measuring method for the exemplary application from FIG. 5. The object O, which is not visible through the cover, i.e., the packaging V, is here supposed to have the shape of the letter "D". A measuring event is carried out corresponding to the measuring plane 100 depicted. The five modular units 10-14 are arranged in lines in the Y direction, and each modular unit 10-14 carries out a measuring event 101-105. The running direction L of the band conveyor F here corresponds to the X direction. By means of the sequence of the measuring events 101-105 running temporally one behind the other, a plurality of measuring events is carried out, by means of which a second dimension of the measuring plane in the X direction is achieved. As a result, a plurality of measuring points is obtained, which are depicted in this Figure as dashes and of which an exemplary measuring point is labelled with 106. The spacing of the measuring points in the Y direction corresponds to the spatial spacing of the modular units 10-14. The spacing of the measuring points in the X direction emerges from the temporal spacing of the sequence of the measuring events 101-105 and the movement speed of the object in the running direction L. Complex-valued raw data is obtained from the measuring events. A raw data image 110 is assembled by pre-processing from the raw data. In the example shown, the measuring point 106 of the measurement results in a pixel in the raw data image 110. In the digital processing and control unit 20, image data of the whole image is calculated from the raw data or the pre-processed raw data image via an algorithm. Based on a two-dimensional measuring (see measuring plane 100), three-dimensional image data can be calculated, whereby a piece of distance information can be allocated to each pixel. An anomaly detection can be carried out by the digital processing and control unit 20 already when calculating the image data.

Based on this three-dimensional information, suitable visualization shapes can be implemented. In FIG. 6, a sectional depiction 120 of the observation space is depicted by way of example. Projecting the spatial information onto a predetermined geometry constitutes another possibility. In further embodiments, only individual sectional images are compiled at predetermined positions, whereby the calculating effort can be considerably reduced and the calculating process can be accelerated. In order to accelerate the calculation in the digital processing and control unit 20 and in order to implement a real-time capable system, the hardware-technical implementation of calculations and calculating steps is provided, for example by using Field Programmable Gate Arrays (FPGAs). Moreover, quick programmable microprocessors and/or graphic processors (GPU) are used for this.

In this embodiment with a very minimal directional effect, the electromagnetic waves are radiated and received, which is why the focusing is undertaken via the algorithm. In further embodiments, the radiation and the reception of the electromagnetic waves is carried out when already focused by the use of lenses or other typical beam shaping concepts of high frequency technology. In a further embodiment, the beam shaping and focusing can be set electronically via phase shifters and/or attenuators in the waveguide. In order to achieve a physical focusing, the calculating effort for image calculating can clearly be reduced.

Next, the image data is evaluated by the image evaluation unit 30 (image postprocessing). Here, firstly the object O is identified 130. In one embodiment, a piece of machine-vision software, for example BVS-Cockpit by Balluff GmbH, is used in order to allow a user to simply carry out certain evaluation steps. In further embodiments, analytical, model-based or self-learning evaluation methods are provided, the latter using artificial intelligence, for example. The image data can be fused with measuring data of further sensors, for example the optical camera 50. Finally, output signals are generated which allow a good-bad evaluation, checking target values, a classification of states or similar. The output signals are emitted via the output interface S3.

Although only a few embodiments of the present invention have been shown and described, it is to be understood that many changes and modifications may be made thereunto without departing from the spirit and scope of the invention.

What is claimed is:

1. A device for generating an image of an object by means of electromagnetic waves, having:
   a transmission device, which is set up to radiate electromagnetic waves in the direction of the object;
   a receiving device, which is set up to receive electromagnetic waves from the object; and
   a digital processing and control unit, which is set up to generate image data of the object from measured data;
   wherein the transmission device and the receiving device are arranged in at least one modular unit, and the digital process and control unit has an interface, via which different modular units are exchangeably coupled to the digital processing and control unit;
   wherein the interface is set up to transmit data to the modular units and to receive from them, to transmit control signals to the transmission device and to the receiving device and to supply the modular unit with energy; and
   wherein the transmission device is set up to emit electromagnetic waves with a frequency or with several frequencies of a frequency range, and the receiving device is set up to receive the electromagnetic waves with the frequency or with the frequencies in the frequency range.

2. The device according to claim 1, wherein the modular unit has a pre-processing device, which is set up to generate partial data of the object from the receiving electromagnetic waves, the interface is set up to transmit the partial image data to the digital processing and control unit, and the digital processing and control unit is set up to generate image data from the partial image data.

3. The device according to claim 1, wherein the digital processing and control unit and at least one modular unit are arranged in a common housing.

4. The device according to claim 1, wherein the digital processing and control unit and at least one modular unit are arranged in different housings.

5. The device according to claim 1, wherein the transmission device emits electromagnetic waves in a frequency range of from 1 GHz to 10 THz, and the receiving device is set up to receive the electromagnetic waves in this frequency range.

6. The device according to claim 1, wherein the transmission device and the receiving device have several measuring channels.

7. The device according to claim 1, wherein the transmission device and the receiving device are set up to carry out a reflection measuring on the object.

8. The device according to claim 7, wherein an absorber or a reflector is arranged opposite the transmission device.

9. The device according to claim 1, wherein the transmission device and the receiving device are set up to carry out a transmission measuring at the object.

10. The device according to claim 1, wherein the digital processing and control unit is set up to ascertain a movement of the object from the measured data.

11. The device according to claim 1, wherein several modular units can be simultaneously coupled to the digital processing and control unit via the interface.

12. The device according to claim 11, wherein the several modular units are arranged in lines.

13. The device according to claim 12, wherein the digital processing and control unit is set up to control the several modular units in such a way that they each simultaneously carry out a measuring in sequences running temporally one behind the other.

14. The device according to claim 11, wherein the several modular units are arranged in different orientations in relation to the object, and the transmission devices radiate the electromagnetic waves from different directions onto the object, and the receiving device receives the electromagnetic waves from different directions from the object.

15. The device according to claim 11, wherein the respective transmission devices of the several modular units radiate electromagnetic waves with different polarization and/or in different frequency ranges, and the corresponding receiving devices of the modular units receive the electromagnetic waves with the different polarization and/or in different frequency ranges.

16. The device according to claim 11, wherein the digital processing and control unit is set up to transmit a reference signal for coherently controlling the modular units to the modular units via the interface.

17. The device according to claim 1, comprising an image evaluation unit which is part of the digital processing and control unit, wherein the image evaluation unit is set up to evaluate the image data generated by the digital processing and control unit and to generate output signals from this and to emit the generated output signals.

18. The device according to claim 1, comprising an image evaluation unit which is modularly connected to the digital processing and control unit and is set up to evaluate the image data generated by the digital processing and control unit and to generate output signals from this and to emit the generated output signals.

19. The device according to claim 18, wherein the modular image evaluation unit is connected to the digital processing and control unit by means of a further interface, and the further interface is set up to transmit the image data from the digital processing and control unit to the image evaluation unit.

20. The device according to claim 18, wherein the modular image evaluation unit is connected to several digital processing and control units and is set up to respectively evaluate the image data generated by the digital processing and control unit and to generate output signals from this and to emit the generated output signals.

21. The device according to claim 1,
wherein the interface between the modular unit and the digital processing and control unit and/or the interface between the modular image evaluation unit and the digital processing and control unit are formed as the connection to a computer network; and
wherein the digital processing and control unit is formed to establish anomalies when generating the image data.

22. The device according to claim 1, wherein the digital processing and control unit or the image evaluation unit has an output interface, via which the generated image data and/or output signals are emitted.

23. The device according to claim 22, wherein the output interface is formed as an IO-link interface, Ethernet or fieldbus interface.

24. The device according to claim 1, wherein the digital processing and control unit or the image evaluation unit is formed to identify a constant symbol from the image data and to emit an error signal when this symbol is no longer identified.

25. The device according to claim 1, wherein the digital processing and control unit and/or the image evaluation unit can be coupled to further sensors and/or is set up to obtain measuring data from further sensors, and the digital processing and control unit and/or the image evaluation unit is set up to include the measuring data of the further sensors in the evaluation.

* * * * *